April 24, 1945.　　　H. PFLEUMER　　　2,374,233
COLLAPSIBLE MOLD
Filed July 24, 1942　　　3 Sheets-Sheet 1

INVENTOR.
Hans Pfleumer
BY
ATTORNEY

April 24, 1945. H. PFLEUMER 2,374,233
COLLAPSIBLE MOLD
Filed July 24, 1942 3 Sheets-Sheet 2

INVENTOR.
Hans Pfleumer
BY
ATTORNEY

April 24, 1945.  H. PFLEUMER  2,374,233
COLLAPSIBLE MOLD
Filed July 24, 1942   3 Sheets-Sheet 3
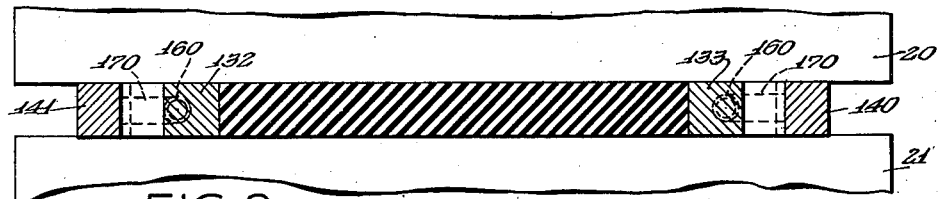
FIG. 9.
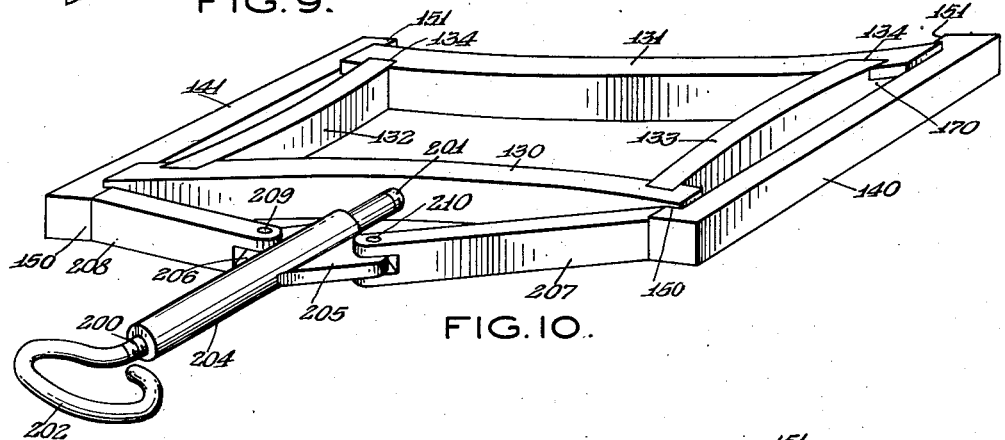
FIG. 10.
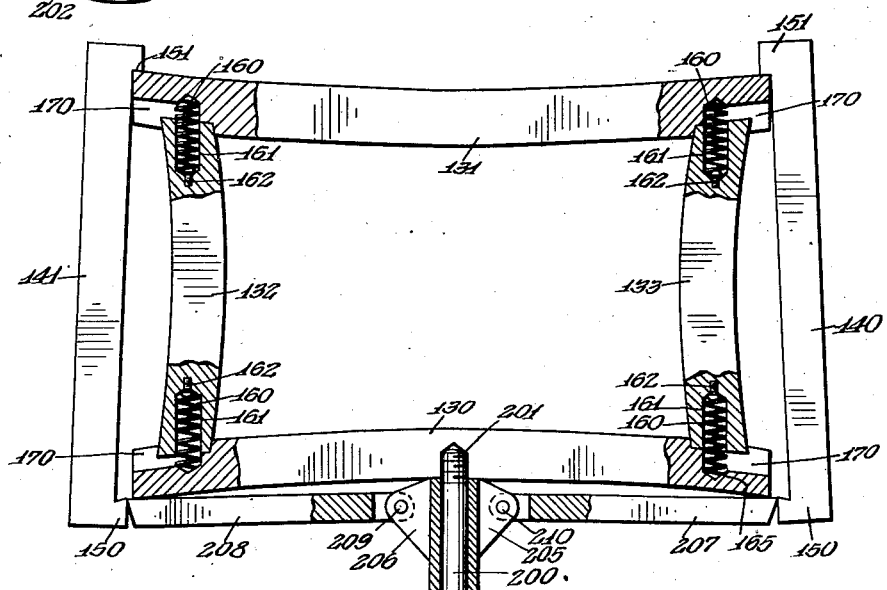
FIG. 11.
INVENTOR.
Hans Pfleumer
BY
ATTORNEY
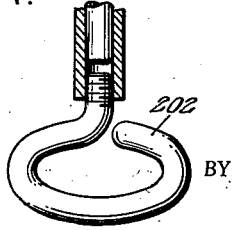

Patented Apr. 24, 1945

2,374,233

UNITED STATES PATENT OFFICE 2,374,233

COLLAPSIBLE MOLD

Hans Pfleumer, New Brunswick, N. J., assignor to Rubatex Products, Inc., New York, N. Y., a corporation of Delaware Application July 24, 1942, Serial No. 452,131

7 Claims. (Cl. 18—34)

My invention relates to collapsible molds and more particularly to a collapsible frame mold which may be utilized in the manufacture of closed cell cellular expanded rubber.

In the manufacture of closed cell cellular expanded rubber, various processes may be used, among which is the so-called Chemical Blow method. In this method, a rubber mix is fully masticated and is treated with a chemical, which upon the application of heat, will degenerate to form gases which may expand the rubber.

The rubber mix thus treated, is then placed in a confining mold and subjected to sufficient heat to cause this degeneration and evolution of gases.

When the presses are opened up after this degeneration of gases has occurred, the rubber thus blown immediately expands. Simultaneously, the rubber mass is at least partially vulcanized in order to give the same sufficient strength to maintain the closed cellular structure without a bursting of the cells.

This process is described in application Serial No. 159,706, now U. S. Patent No. 2,299,593, which is assigned to the assignee of the present application.

Perhaps the most important part of this process is played by the mold within which the compound is blown. As the process is practiced at the present time, a frame mold is solidly filled with the compound to be blown. The frame containing the rubber is confined between the hot platens of a press and the rubber is blown in this absolute confinement. Consequently, at the time of the blow the pressure developed within the cells is extremely high. Experimental computations reveal that the pressure within the frame, and, therefore, within each cell rises to approximately 68 atmospheres or 1000 pounds per square inch.

Before the blown and precured rubber can be expanded, it is necessary to cool off the press and also to cool off the rubber in order to give the rubber enough strength to withstand the stresses to which it is subjected during the removal from the press.

Even then, the cooled off rubber, being still under high internal pressure, undergoes violent treatment. Before the press can be opened far enough to make room for the expanding rubber, the force of the internal pressure pushes the rubber through the narrow openings created during the initial separation of the platens of the press. Even after the press is fully opened, the sharp edges of the mold frame exert a destructive force upon the surface of the rubber sheeting.

When rubber is vulcanized in a confined state and then forcefully expanded into a cellular structure, the cell walls have a tendency to assume the dimensions they had during the vulcanization. In other words, there exists a certain power (or "memory") in the film to contract to its original size which is opposed by the internal gas pressure which, as the cells shrink, grows higher and thereby tends to diffuse through the cell walls.

This phenomenon is more pronounced in expanded rubber which has been expanded from a precure mold size to its normal size after the rubber has been cooled off and a certain amount of the initial tensile strength of the rubber has been recovered. If, however, the precured vulcanized rubber is expanded while it is still hot before the presses have cooled, the film contraction later on is thus avoided.

Accordingly, it is of extreme importance that the expansion be permitted to occur while the rubber is still hot.

The frame mold previously used in this process has to a great extent impeded any operation which would permit the separation of the platens of the press while the rubber is hot.

If, for instance, it is desired to blow a finished structure to eight times its solid rubber volume, it may only expand six times after being expanded cold, and it must be expanded still more in the finishing mold to fill the same out. By doing this, some of the gas content diffuses through the rubber before the matrix is completely filled out, and in case of soft cellular rubber, a flabby and lifeless product results.

In case of hard closed cell cellular rubber, a porous product may result, rather than a closed cellular product. If, however, the rubber is expanded from its precured size while still plastic, the expansion to eight times the original volume may be attained directly without necessitating additional strain upon the cell walls. In this case, the expanded rubber fills out the secondary mold without voids, the necessary vulcanizing heat is transmitted faster and gas within the cells is prevented from diffusing.

Hot expanding gas has a greater driving force by approxiamtely 25%, so that when the rubber is expanded while the gas contained in the cells is still at elevated temperature, the cells will be still more elongated, or so to speak, overstretched.

Indeed, it has been observed that hot expanded rubber immediately after release, swells up in excess of the volume intended, whereupon it slowly settles down. This is not because the gas escapes through the cells walls, but rather because it cools off. But by doing this, the cell walls are slightly overstretched, and a subsequent contraction is thereby offset.

I have evolved a mold in which the existing difficulties of expansion, marring an otherwise satisfactory process, are overcome.

With my novel mold it becomes unnecessary to cool off the press and the rubber, but the rubber may be expanded while it is still hot without damage being inflicted upon it by the mold.

The essential principle of my mold consists of the feature of interlocking the members of the mold in such a way that they perform as a substantial confining device when the platen pressure is in force, but collapse and separate when the platen pressure is removed. The members of the frame are thus pushed aside by the expanding rubber and can do no damage to the surfaces of the rubber sheet.

In other words, therefore, the essence of my invention is the provision of a collapsible mold which will form a single solid unitary mold when pressure is applied thereto in a press but which will come apart when pressure is released so that the expanding material may push the parts of the mold aside during expansion and so that the expanding material will not be marred or distorted by pressure against the portions of the mold itself.

The principal object of my invention, therefore, is the provision of a collapsible mold for use in treating rubber which is confined between the platens of a hot press.

Another object of my invention is the arrangement of a frame mold in such manner that when external pressure is applied to opposite portions thereof, the frame will act as a single confining mold but when such pressure is released, the portions of the mold will separate so as to permit full expansion of the material contained therein.

These and many other objects of my invention will become apparent from the following description and drawings, in which Figure 1 is a schematic cross-sectional view showing an existing type of frame mold for expanding rubber material partially confined between the platens of a press.

Figure 9 is a cross-sectional view taken on line 9—9 of Figure 10 looking in the direction of the arrows.

Figure 10 is a view in perspective of a modified and preferred form of collapsible frame mold.

Figure 11 is a top view partially broken away of the frame mold of Figure 10.

Figure 1:
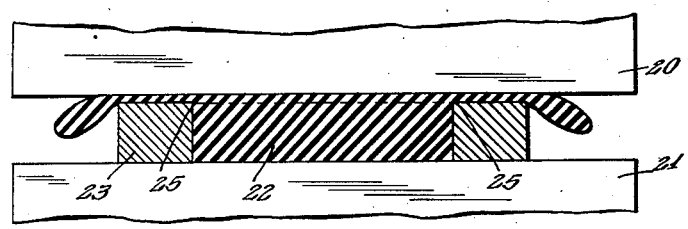

Referring now to Figure 1, there is here shown somewhat schematically an old type solid frame mold and the condition which occurs where after the rubber has been chemically blown the platens of the press begin to separate.

Figure 2:
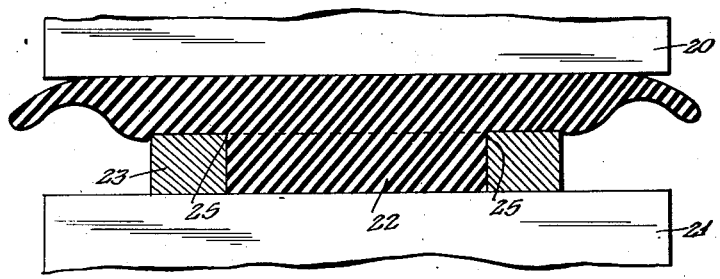
Figure 2 is a cross-sectional view corresponding to that of Figure 1 showing the platens of the press further opened.
Figure 3:
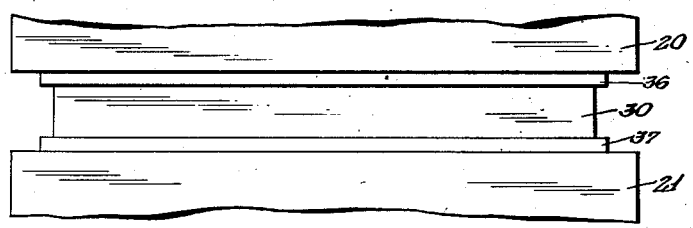
Figure 3 is an end view of a collapsible frame mold of my invention.

It will be seen that when the platens 20 and 21 begin to separate the rubber mass 22 which is under a high pressure of the order of 68 atmospheres or 1000 pounds per square inch within the frame mold 23 begins to splay out around the edges of the frame mold. This obviously results in injury to the rubber sheet when it is fully expanded since the corners 25, 25 tend to cut into the rubber mass as its internal pressure drives it against these corners. Even when the platens of the press are fully expanded, as shown in Figure 2, the same condition occurs since a portion of the rubber mass 22 is still confined within the frame mold 23 while the remainder may splay out. It is not until the rubber mass 22 has been completely removed from the frame mold 23 that it is removed from these cutting or tearing stresses.

Consequently, the rubber sheet produced by the utilization of this mold has been tortured, twisted, cut and marred during the process of opening up of the press. In order to avoid this result, at least to some extent, it has been found necessary to cool the presses to a great extent before opening the same permitting the rubber to expand. This results in a rather limited expansion which thereafter requires a further application of heat to fully expand the rubber.

My invention contemplates the use of a collapsible frame mold in place of the solid frame mold 23, the parts of which will fly apart laterally when the platens 20 and 21 of the presses begin to separate so that the cutting, marring or twisting forces exerted upon the rubber mass 22 when the solid frame 23 of Figures 1 and 2 is used, will be obviated.

One form which my collapsible mold may take is shown in Figures 3 to 8 inclusive.

Figure 5:
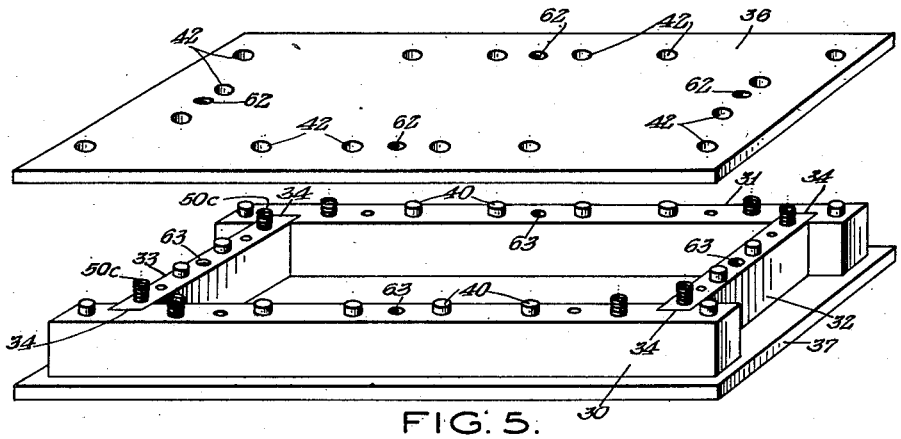
Figure 5 is a view in perspective showing the various parts of my frame mold and their relationship to each other.

Referring more specifically to Figure 5, the collapsible mold consists of a pair of longitudinal members 30 and 31 and a pair of lateral members 32 and 33. The longitudinal members 30 and 31 are each notched or recessed at 34, 34 adjacent the ends thereof to receive the ends of the lateral members 32, 32 as seen in Figure 5.

A pair of retaining plates 36 and 37 are provided for the upper and lower sides of the frame mold. The function of these plates is to maintain the lateral and longitudinal frame portions 30 to 33 in engagement with each other.

It will be seen that, ordinarily, when the members are in the position shown in Figure 5, the force of the expanding rubber will drive them apart. Thus, when the platens 20 and 21 of the press previously set forth are separated, the expanding rubber will, in exerting its force in all directions against the frame mold of Figure 5, spread apart the longitudinal frame members 30 and 31. When these members are spread apart slightly, the notches 34, 34 are disengaged from the ends of the lateral frame members 32, 32 and these members may then be spread apart by the expanding rubber mix.

Thus, the cutting or marring of the expanding rubber is obviated since the frame members which would normally perform such cutting, marring or twisting of the expanding rubber are so arranged that they may be pushed aside by the rubber as it expands.

It is necessary in the utilization of a collapsible or separable frame mold such as that shown in Figures 3 to 8 to provide members for retaining the frame in mold arrangement both preparatory to placement of the mold in the press and while it is in the press.

The plates 36 and 37 cooperating with the pins and springs in the frame members perform this function.

Figure 4:
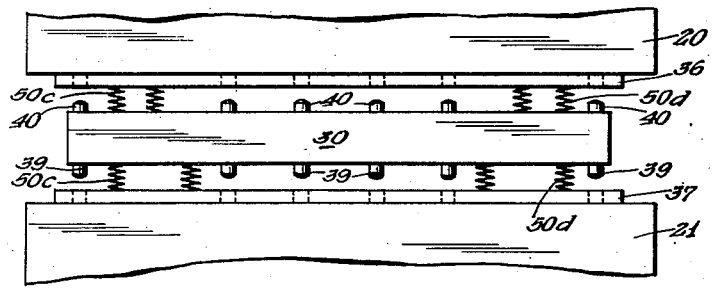
Figure 4 is an end view showing the mold of Figure 3 in the condition which it assumes when the platens of the press are opened.

Referring now to both Figures 4 and 5, it should be noted that in Figure 4, the longitudinal frame member 30 of Figure 5 is clearly visible. This longitudinal frame member is provided with a plurality of pins 39 extending from the lower side thereof and a similar set of pins 40 extending from the upper side thereof. These pins are secured to and made a part of the frame member 30 in any suitable manner.

Figure 7:
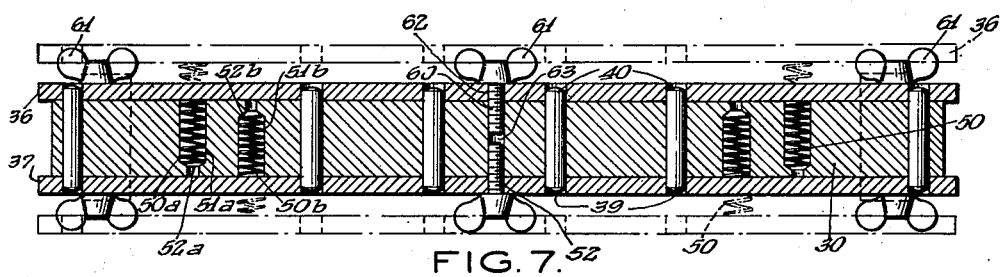
Figure 7 is a cross-sectional view taken on line 7—7 of Figure 6 looking in the direction of the arrows.

One way in which these members may be secured to the frame member 30 is shown, for instance, in Figure 7 where it will be seen that the pins 39 and 40 constitute opposite ends of single dowel pins which are securely positioned in openings in the longitudinal frame member 30. Each of the frame members 31 to 33 have similar pins extending from either side thereof.

The retaining plates 36 and 37 each have a plurality of perforations 42 therein which are adapted to register and be engaged by the pins 39 and 40. Thus, when the collapsible mold or frame is laid together in the form shown in Figure 5, the placement of the plates 36 and 37 over, respectively, the pins 40 and 39 on either side of the frame serves to integrate the frame and inter-engage its parts so that they cannot separate while the plates are in the position of, for instance, plate 37 of Figure 5 or of the plates 36 and 37 of Figures 6 to 8.

Means must be provided, however, in order to separate the plates 36 and 37 in order to disengage the perforations 42 thereof from the pins 39 and 40 so as to permit the frame members to be forced apart by the expanding rubber.

For this purpose a plurality of springs 50, 50 (Figures 4 to 8 inclusive) are provided. As is seen more particularly in Figure 7, each of the springs 50 is positioned in counter-sunk openings 51, 51 in the frame members. Thus, for instance, spring 50a in the longitudinal member 30 (Figure 7) is secured in opening 51a and is firmly attached to the material of the frame member 30 at the bottom 52a of the opening 51a. This spring when fully extended extends substantially above the top of the frame member 30, as is seen for instance in Figure 5.

Similarly, spring 50b is secured at 52b in the opening 51b. This spring also when fully extended will extend beyond the bottom of the frame member 30. As will be seen from Figures 5 and 7, two such spring members are provided at either end of the longitudinal frame member 30 on either side thereof.

Similarly, springs 50c, 50c are provided for the lateral frame member 33 and springs 50d, 50d are provided for the lateral frame member 32; and a similar set of springs is also provided for the longitudinal frame member 31.

Accordingly, when the plates 36 and 37 are pushed down over their respective pins 39 and 40 so that the perforations 42 thereof engage with the pins, the various springs 50 on either side are compressed so that when the pins holding the plates 36 and 37 against the frame mold are released, the springs will push the plates away and disengage the pins from the perforations.

Upon the occurrence of this disengagement, there will no longer be any structural element holding the frame members 30 to 33 together and the expanded rubber under pressure within the frame mold will push these frame members apart.

In actual practice, I first arrange the frame members 30 to 33 in the arrangement shown in Figure 5 wherein the ends of the lateral members 32 and 33 are engaged in the notches 34 of the longitudinal frame members 30 and 31. I then push the plates 36 and 37 down over the ends of the pins 40 and 39 in order that the perforations 42, 42 of the plates may be engaged by the pins and thus hold the frame member in place.

Figure 6:
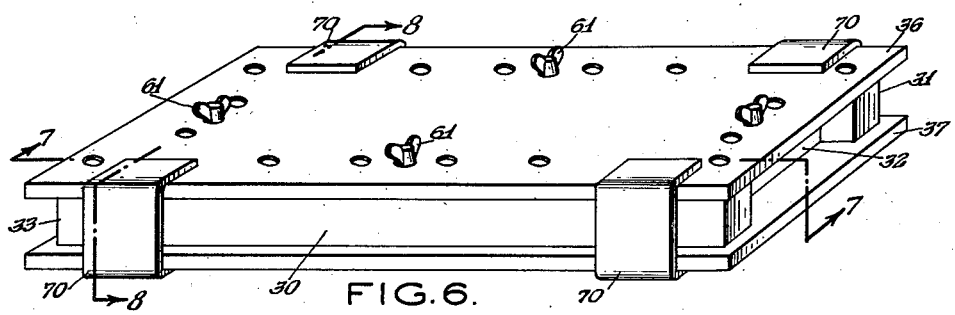
Figure 6 is a view corresponding to that of Figure 5 showing the parts of my frame mold secured to each other.
Figure 8:
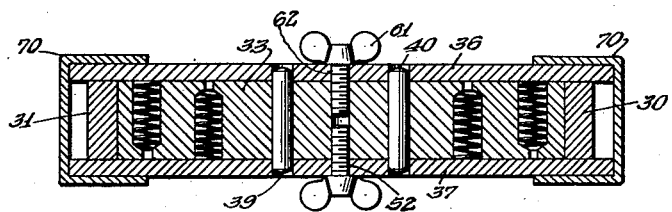
Figure 8 is a cross-sectional view taken on line 8—8 of Figure 6 looking in the direction of the arrows.

I then pass the bolts 60 having the winged heads 61 through the openings 62, 62 in each of the plates into corresponding threaded openings 63, 63 in each of the frame members and by tightening these bolts securely compress the springs 50 and firmly hold the plates 36 and 37 in place as shown in Figures 6 to 8.

Thereafter, I place the U-shaped clamps 70, 70 over the edges of the composite frame member, these clamps being sufficient to hold the frame in molding arrangement. Of course, it will be understood that the rubber mix which is to be chemically blown and expanded is now inside the frame mold of Figures 6 to 8. The mold may now be left in this condition until the operator is ready to place the same between the platens of the press.

When this operation is to be performed, the bolts 60 are removed by rotating the winged head 61 thereof and the only force now holding the plates 36 and 37 in place on the frame mold and thus holding the mold in molding position are the clamps 70.

The platens of the press are now fully separated and the formed mold with the bolts removed but the clamps holding the same together is placed between these platens. The platens are then brought together to a point where the space between the platens is only slightly wider than the U-shaped clamps 70. The U-shaped clamps 70 are then removed. The springs 50 will now be permitted to expand to force the plates 36 and 37 against the platens but the space through which the plates 36 and 37 may then be moved is now so small, that this movement of the plates will not disengage the perforations 42 thereof from the pins 39 and 40.

The platens are now brought tightly together, thus forcing the plates 36 and 37 against the frame mold so that the form which the mold now assumes within the press is that shown in Figure 7 with, however, the bolts 60 having the winged head 61 and the clamps 70 removed.

The blowing or expanding operation now takes place. Upon completion of this blowing or expanding operation, the platens 20, 21 of the press (Figure 4) may now be separated. As this separation occurs, the springs 50 as previously described and as is seen in Figure 4, push the plates 36 and 37 away from the frame members 30 to 33 until the pins 39 and 40 are disengaged from the perforations 42 therein. Immediately upon the occurrence of this disengagement, the blown rubber in the mold is now permitted in its expansion to push the frame members apart—first by pushing the longitudinal members 30 and 31 outwardly until the notches 34 are disengaged from the lateral frame members 32 and 33 and then by pushing all of the frame members outwardly.

Figure 4 represents but an instantaneous stage in this process which shows the condition where the platens 20 and 21 of the press have been separated sufficiently to permit the plates 36 and 37 to be pushed out of engaging relation with the frame members 30 to 33. At this instant, the expanding rubber has begun to drive the frame members apart and as it expands drives these members apart in the manner previously pointed out.

By the utilization of a collapsible frame mold of this type, the difficulties encountered with the previous solid frame molds and described more particularly in connection with Figures 1 and 2 are obviated. The rubber is not cut, marred or twisted during the separation of the platens of the press. Since the rubber may now freely expand without being cut against the edges of the frame mold, it is not necessary to cool the rubber before separating the press, but the press may be separated while it is hot. This also adds to the efficiency of the operation since it is not then necessary to cool the entire press but rather the press may be used again for a subsequent operation without having to be brought up to the appropriate heat once more.

In Figures 9 to 11 I have shown a modification of my device which, however, does not require the utilization of the plates 36 and 37; which, in fact, does not require the utilization of the pins or springs previously described. Here again, the longitudinal frame members 130 and 131 are notched at 134 in order to receive the ends of the lateral frame members 132 and 133. In this case it should be noted the frame members 130 to 133 are so arranged as to form a substantially rectangular figure, where, however, the corners extend slightly outwardly. This shape thus imparted to the mold is important for purposes of future expansion.

Where a square sheet of closed cell cellular expanded rubber is desired, the rubber sheet in the precure stage must be so formed that it may readily fill out the final mold. When, in the precure stage, the rubber is formed in exact rectangular form, then when it has been placed in the final mold, the corners tend not to fill out the mold. This is so because the expansion diagonally must be over a greater extent than the expansion along lines bisecting the center of the sides of the rectangle. Accordingly, if in the precure stage, the corners of the rectangle of rubber are extended outwardly to a slight extent, this disadvantage is overcome and in the final curing stage, the sheet of rubber may extend to fully fill out the rectangular mold.

This shape of the frame mold may be utilized not only in the construction of Figures 9 to 11 but also in the construction of Figures 3 to 8. It may, in fact, be utilized in connection with solid frame molds where it may be found necessary or desirable to use such molds.

The frame members 130 to 133 are held together by lateral locking members 140 and 141. These members as may readily be seen in Figures 10 and 11 have longitudinal extensions 150, 151 at each end thereof which engage against the outside ends of the longitudinal frame members 130 and 131. Thus it will be seen from an inspection of Figures 10 and 11 that the lateral frame members 132 and 133 are held in position by their engagement in the notches 134 of the longitudinal frame members 130 and 131, while the longitudinal frame members 130 and 131 are held in fixed relationship with each other by the engagement of the extensions 150 and 151 of the members 140 and 141 against their outer ends.

As long as the locking members 140 and 141 are in position, as shown in Figure 10, the frame members cannot separate. When the locking members 140 and 141 are pushed to the position shown in Figure 11, then the longitudinal frame member 130 is no longer retained in position by the extensions 150 and the longitudinal frame member 131 is no longer retained in position since, even though the extensions 151, 151 bear against this member, the opposite end of the locking members 140, 141 is no longer fixed. Accordingly, the frame members 130 and 131 may fly apart under the pressure of the blown or expanded rubber confined thereby.

When these members separate, then the notches 134 thereof are disengaged from the ends of the lateral frame members 132 and 133 and these members may now fly apart under the pressure of the expanding rubber. Accordingly, the mold may readily collapse in the manner previously described.

Although it is not essential, various mechanical aids may be provided to assist these members in flying apart under the influence of the blown rubber once the locking members 140 and 141 are disengaged. Thus, for instance, I may provide springs 160, 160 secured at the bases 162 of countersunk recesses 161 in each of the ends of the lateral frame members 132 and 133. When the frame members 130 to 133 are placed together, the ends of the springs 160 are pressed against the bases of the notches 134. The outer ends of the springs 160 may, if desired, merely bear against the base of the notch 134. In order, however, to positively position the frame members with respect to each other, an opening 165 may be provided in the base of each notch within which the outer ends of the springs may register.

On release of any force which holds these frame members together, the extensions of the springs 160 will drive the frame members apart so that an additional mechanical bias in addition to the pressure of the blown or expanded rubber will act to separate the frame members. The lateral frame members 132 and 133 will begin to move outwardly as soon as their ends are disengaged from the ends 134. However, the springs 160 will still be in the notches at this time so that the expanding force of the blown rubber will tend to break or snap the springs.

In order to obviate this result, a slot 170 may be placed in the end of each of the longitudinal frame members 130 and 131 communicating with the base of the notch or the base of the spring retaining opening in the ends of the longitudinal frame members 130 and 131 so that the springs may slide out through the slots. These slots are of a width equal in diameter to the spring retaining opening 165 hereinbefore described and thus permit the springs readily to slide out while they do not interfere with the locking effect exerted by the notches 134.

Such spring members may, of course be secured in the base of notches 134 and bear against the ends of the lateral bars, in which case no slots 170 need be provided; or a combination of these elements may be used, a spring being secured at the end of a lateral bar on one side and in a notch at the other side.

The engagement of the frame members with each other to form the collapsible framing mold and the arrangement of the locking members 140 and 141 to hold the collapsible framing mold together presents no difficulties whatever; nor does the separation of the members of the mold, provided appropriate precautions are taken.

For this purpose, it should be noted that the locking members 140 and 141 have a height which is substantially less than the height of the frame members 130 to 133. Accordingly, when the platens 20 and 21 of the press are tightly pressed against the frame members 130 to 133, the locking members 140 and 141, since they have a width which is less than the distance between the platens, are loose so that they may be readily moved to disengaging position.

However, this disengagement of the bars 140, 141 must be uniform on both sides since otherwise one corner of the mold might be blown open prematurely. This force would thereby endanger the other three corners. When the locking bars 140 and 141 become disengaged the platen pressure alone might or might not hold down in position the frame bars 130 to 133, and therefore, it is obvious that the disengagement must occur at exactly the same time on both places 150 to prevent any pinching and damage to the frame parts.

Any suitable means may be provided for disengaging the locking members 140 and 141. One means which I have found desirable in practice is shown in Figures 10 and 11.

In the exact center of bar 130, a stud 200 is fastened by thread or welding to form an integral part of this frame bar. Upon this stud 200 the spreading assembly is slidably mounted. It consists of a length of pipe 211 forming on the outside end a handle 202 and on the inside end the sleeve 204 bearing snugly upon stud 200. Two clevised ears 206 are attached at the opposite sides to the pipe 211 to which by means of clevis pins 209, 210, the two spreading legs 207, 208, which are of the same length are movably secured.

The movement of the hooks 150 is short, while the movement of the sleeve is long, so that there is no difficulty in forcing the hooks 150 out of place.

The spreading device may be attached at any time before the intended disengagement and one device may serve many molds.

As seen in Figure 10, when the mold has been prepared for use with the locking members 140 and 141 in place thereon, the handle 202 is positioned outwardly or may be removed.

Links 207 and 208 also have a height which is substantially less than that of the frame members 130 to 133 and likewise, the diameter of the sleeve 204 is substantially less than this height so that the links and the sleeve may readily move between the platens of the press when these platens are tight against the frame members.

The frame mold in the condition as shown in Figure 10 is now placed on the lower platen 21 (where it may be placed without the spreading device), the rubber mix is placed therein and the upper platen 20 is pressed down tight against the frame mold and heat is applied to cause the blow and expansion.

When the spreading device is put in operation, then by simply pushing the handle against the frame, the locking bars 140 and 141 are moved out of position, and the frame may then be opened by the expanding rubber when the platens of the press are separated.

Now immediately upon separation of the platens 20 and 21 of the press, the frame members 130 to 133 will be pushed apart by the springs 160 and by the expansion of the blown rubber, so that no cutting edge or stiffly positioned member will be interposed in the path of the expanding rubber to mar, twist or cut the same.

Suitable guards may be provided outside the presses to catch the frame members as they separate or suitable securing members may be provided to prevent the frame members from moving beyond a predetermined expansion.

When it is desired now to use the mold once more, the members need only be assembled once more to the position shown in Figure 10 and the process may be repeated.

In each of the foregoing modifications, the essential element is the provision of a frame mold so arranged that the elements thereof may fly apart in accordance with the expansion of the rubber so that a condition such as that which obtains in connection with the solid frame mold shown in Figures 1 and 2 will not occur.

By the utilization of such a slidable frame mold, the marring, distortion, twisting or cutting of the rubber is prevented. Since the rubber may readily expand in all directions without being inhibited in any way, it is possible to separate the platens of the press before cooling the rubber so that a more even expansion of the rubber is obtained while at the same time efficiency in operation is increased since the platens need not be heated up once more.

In all of the foregoing, I have described my invention only in connection with preferred embodiments thereof. Many variations and modifications should now be obvious to those skilled in the art. I prefer therefore to be bound not by the specific disclosures herein but only by the appended claims.

I claim:

1. In combination a frame mold and a press having a pair of platens, said mold being disposable between the platens of the press, said mold comprising a plurality of separable frame members; means for interconnecting said frame members in framing relation; said means cooperating with the platens of the press for connecting said members and operable upon the separation of the platens of the press to effect disconnection of said members.

2. In combination a frame mold and a press having a pair of platens, said mold being disposable between the platens of the press, said mold comprising a plurality of separable frame members; means for interconnecting the ends of said frame members in framing relation; said means cooperating with the platens of the press for connecting said members and operable upon the separation of the platens of the press to effect disconnection of said members.

3. In combination a frame mold and a press having a pair of platens, said mold being disposable between the platens of the press, said mold comprising four separable frame members; means for interconnecting the ends of said frame members in substantially rectangular framing relation; said means cooperating with the platens of the press for connecting said members and operable upon the separation of the platens of the press to effect disconnection of said members.

4. In combination a frame mold and a press having a pair of platens, said mold being disposable between the platens of the press, in a process of expanding material within a confined area; said mold comprising a plurality of separable frame members arrangeable in framing relation to form a confining frame for said material, each of said members having a plurality of pins extending therefrom normal to the plane of said frame; a pair of plates, each plate having a plurality of perforations registrable with said pins and disposable on either side of said frame; said plates when in place upon said pins and when said mold is confined between said platens of the press maintaining said members in framing relation.

5. A frame mold for use between a pair of platens of a press in a process of expanding material within a confined area; said mold comprising a plurality of separable frame members arrangeable in framing relation to form a confining frame for said material, each of said members having a plurality of pins extending therefrom normal to the plane of said frame; a pair of plates, each plate having a plurality of perforations registrable with said pins and disposable on either side of said frame; said plates when in place upon said pins and when said mold is confined between said platens of the press maintaining said members in framing relation, and spring means interposed between said members and said plate urging said plate away from said members; the bias of said spring means being counteracted by the pressure of the platens of said press when said mold is in said press.

6. A frame mold for use between a pair of platens of a press in a process of expanding material within a confined area; said mold comprising a plurality of separable frame members arrangeable in framing relation to form a confining frame for said material, each of said members having a plurality of pins extending therefrom normal to the plane of said frame; a pair of plates, each plate having a plurality of perforations registrable with said pins and disposable on either side of said frame; said plates when in place upon said pins and when said mold is confined between said platens of the press maintaining said members in framing relation; spring means interposed between said members and said plates urging said plates away from said members; the bias of said spring means being counteracted by the pressure of the platens of said press when said mold is in said press; and means for counteracting the bias of said spring means prior to the placement of said mold in said press.

7. A frame mold for use between a pair of platens of a press in a process of expanding material within a confined area; said mold comprising a plurality of separable frame members arrangeable in framing relation to form a confining frame for said material, each of said members having plurality of pins extending therefrom normal to the plane of said frame; a pair of plates, each plate having a plurality of perforations registrable with said pins and disposable on either side of said frame; said plates when in place upon said pins and when said mold is confined between said platens of the press maintaining said members in framing relation, and spring means interposed between said members and said plates urging said plates away from said members; the bias of said spring means being counteracted by the pressure of the platens of said press when said mold is in said press; said plates being removed from engaging relation with said pins upon separation of the platens of said press; said material thereupon pushing said members apart.

HANS PFLEUMER.